United States Patent [19]

Redlich

[11] Patent Number: 4,907,005
[45] Date of Patent: Mar. 6, 1990

[54] RADIOFREQUENCY POWER DISTRIBUTOR FOR INSTRUMENT LANDING SYSTEM LOCALIZER ANTENNA ARRAYS

[76] Inventor: Robert W. Redlich, 9 Grand Park Blvd., Athens, Ohio 45701

[21] Appl. No.: 355,194

[22] Filed: May 22, 1989

[51] Int. Cl.$^4$ ............................ G01S 1/16; G01S 1/18
[52] U.S. Cl. .................................................... 342/413
[58] Field of Search ................................ 342/413, 410

[56] References Cited

U.S. PATENT DOCUMENTS 3,711,857  1/1973  Cummings .
4,101,892  7/1978  Alford .

Primary Examiner—Theodore M. Blum

[57] ABSTRACT

Disclosed is a radiofrequency distributor for a two frequency Instrument Landing System Localizer transmitting antenna array, for the purpose of driving each antenna with predetermined modulated radiofrequency currents of four different types, the distributor consisting of a combination of quarter wavelength power dividers and bidirectional couplers.

1 Claim, 1 Drawing Sheet

RADIOFREQUENCY POWER DISTRIBUTOR FOR INSTRUMENT LANDING SYSTEM LOCALIZER ANTENNA ARRAYS

BACKGROUND OF THE INVENTION

References:
1. Peterson, C. G., Localizer Traveling Wave Antenna Development. Report No. FAA-RD-76-129. Department of Transportation, Federal Aviation Administration. May, 1976.
2. Alford, A., French, E., and Schwartz, R., A Guide for the Selection of Antenna Characteristics for Single Frequency and Two Frequency Localizers in the Presence of Reflecting Structures. Report No. FAA-RD-75-64. Department of Transportation, Federal Aviation Administration. April, 1975.
3. U.S. Pat. No. 4,415,902
4. Disclosure Document no. 103421

The instrument Landing System Localizer is in worldwide use to provide azimuth guidance to aircraft on final approach to landing. It does so by radiating a radiofrequency carrier in the range 108-112 mhz., tone modulated with 150 hz. and 90 hz. Localizer signal is radiated so that equal tones are received on runway centerline and its extension, while 150 hz. and 90 hz. predominate right and left of centerline respectively. Within about 3 degrees either side of centerline, the difference between the amplitudes of the received tones varies linearly with angular displacement from centerline, and is used to provide an indication of the approaching aircraft's position relative to centerline. In addition to the linear region, a "clearance" region extending to ±35 degrees, in which "full left" and "full right" indications are received, is required by international standards.

The requirement for clearance signals means that the localizer beam is wide and may reflect from structures such as hangars or terminal buildings; such reflections being capable of producing unacceptable bends in the equal-tone surface, which is nominally a vertical plane through runway centerline (Ref. 2). To reduce their effect, "two-frequency" Localizers are used (Refs. 1 and 2). They use two separate RF carriers, separated in frequency by typically 8 khz. One carrier is radiated in a relatively narrow beam, typically within ±10 degrees of centerline. It is called the "course signal" and provides primary guidance near centerline. The other carrier is radiated in a wide beam, extending to at least ±35 degrees from centerline, and relatively weak compared to the course signal near centerline. It is called "clearance signal" and supplies full left and full right indications. The well known "capture effect" causes the receiver in the approaching aircraft to respond only to the dominant signal, i.e., to course signal near centerline and to clearance signal at angles more than about 5 degrees off centerline. Since hangars, etc., are normally in the clearance beam but not the course beam, reflections from them, received near centerline, are discriminated against by capture effect and produce very little disturbance of the equal tone surface or its neighborhood.

Localizer signals are radiated from linear arrays of antennas located at the stop end of the runway. Some two-frequency localizers use two separate arrays to radiate course and clearance, but it is advantageous from the viewpoints of cost, reliability, and maintenance to use a single array to radiate both. In order to do this, each antenna in the array must be driven by modulated RF currents at course and clearance frequencies in such a way as to generate the required course and clearance radiation patterns. Four distinct signals are involved, two generated by a course transmitter and associated with course radiation, and two generated by a clearance transmitter and associated with clearance radiation. The first of the two course signals is "course carrier", which is an RF carrier modulated equally by 90 hz. and 150 hz. Course carrier is radiated symmetrically around centerline and by itself contains no guidance information. The second course signal is "course sidebands", which is an RF carrier balanced modulated with equal 90 hz. and 150 hz. tones, the audio phase of one of these tones being reversed relative to its phase on the course carrier signal. Course sidebands are radiated antisymmetrically around runway centerline. When radiated course carrier combines with radiated course sidebands in space, a signal is produced having equal tones on centerline, a predominance of 150 hz. right of centerline, and a predominance of 90 hz. left of centerline. Two similar signals are used to radiate clearance, namely, "clearance carrier" and "clearance sidebands".

If one array is used to radiate both course and clearance, each of the four signals must drive each antenna in the array with a current of such magnitude as is determined from the required radiation pattern of that signal. A distributor is necessary to divide power of each type and to route the correct fraction of power of each type to each antenna, with the correct radiofrequency phase. Prior art distributors have disadvantages of complexity and resulting cumulative errors in power distribution. They are also generally non-repairable and inflexible in the sense that errors in power distribution discovered during or after development of the distributor are difficult and expensive to correct. The purpose of the present invention is to provide a distributor that is relatively simple, precise, economical, extremely reliable, and easily adjustable during the development process.

The novelty of the present invention is believed to be its use of a multiplicity of simple power dividers consisting of tapped quarter-wave sections of transmission line, in combination with conventional bidirectional couplers for signal combination and division. Prior art, by contrast, uses two bidirectional couplers, connected by phase-shifting transmission lines, for each power division; which technique leads to complexity and cumulative errors in power division.

DESCRIPTION OF A TYPICAL EMBODIMENT

Figure 1:
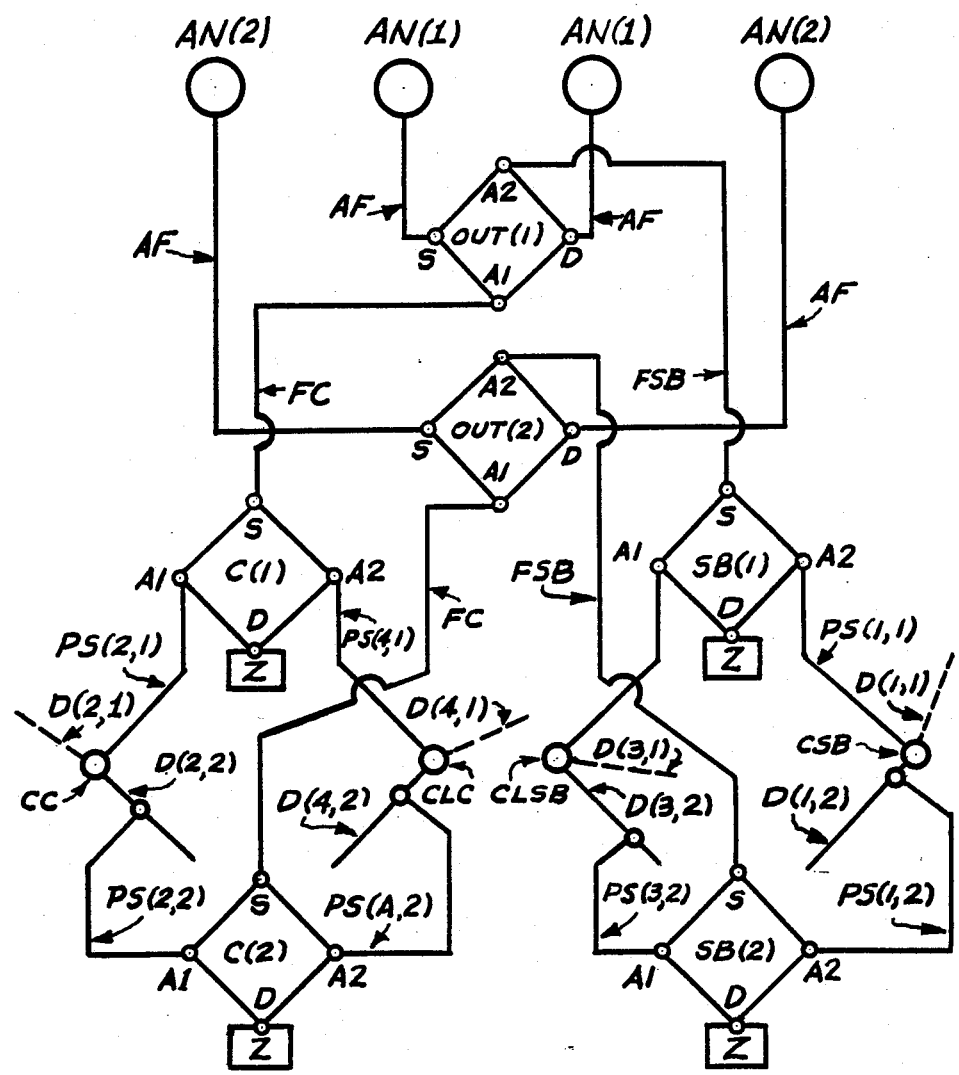
FIG. 1 is a schematic diagram of the invention as it is applied to an array of four antennas.

The invention can be applied to antenna arrays of any even number of antennas. FIG. 1 illustrates its application to an array of four antennas, which is the smallest number for which the principles of the invention can be fully described. The antennas are assumed to follow conventional practice, according to which they are matched to a transmission line of characteristic impedance Z, which impedance is commonly 50 ohms. The invention consists of two basic elements that are interconnected with two-conductor transmission lines which, in practice, would be either coaxial or stripline. For clarity, transmission lines are represented in FIGS. 1 and 2 by a single line of the drawings.

Figure 2:
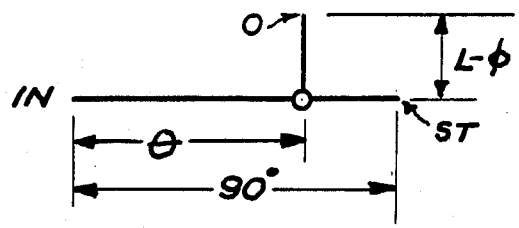
FIG. 2 is a schematic diagram of a single power divider.

The first basic element of the invention is a power divider as illustrated by FIG. 2. It consists of a tapped quarter-wave transmission line, which may otherwise be described as having electrical length of 90° or $\pi/2$ radians. One end of the quarter-wave line, labeled IN in FIG. 2, is the end to which an input voltage will be applied, and the other end, labeled ST, is shorted. A tap is located at electrical angle $\theta$ from the IN end, and to it is connected one end of a transmission line of electrical length, expressed as an angle, of $(L-\phi)$, where L is a fixed angle independent of $\theta$, and $\phi$ is a function of $\theta$ according to the formula:

$$\phi = \arctan(\tfrac{1}{2} \sin(2\theta)).$$

The other end of the transmission line of length $(L-\phi)$ is labeled "O" in FIG. 2 and is the end from which an output voltage will be taken. If the transmission line from which the divider is made has characteristic impedance Z, and if a resistor of magnitude Z is connected to its output end O, then it can be shown from conventional transmission line theory that:

$$\frac{\text{output voltage}}{\text{input voltage}} = \frac{\cos(\theta)}{(1 + \tfrac{1}{4}\sin^2\theta)^{\frac{1}{2}}} \times e^{-jL}.$$

The magnitude of the ratio of output to input voltage decreases monotonically from 1.0 to zero as $\theta$ increases from zero degrees to 90°, while the phase of the ratio is independent of $\theta$, and equal to a lag of L degrees. It follows that a number of dividers all connected to the same input voltage can be used to generate a number of different output voltage ratios between zero and 1.0, all such ratios having the same phase relative to input voltage. The invention uses multiple dividers in such manner; one set of dividers for each of the four signal types.

The second basic element of the invention is a "bidirectional coupler" which is a well known passive electrical device having four pairs of terminals, and which will be referred to hereafter as simply "couplers". They are depicted in FIG. 1 by diamond shaped objects having terminal pairs labeled A1, A2, S, and D. Couplers have the following properties:

(1) If resistance of magnitude Z is connected to each of terminal pairs S and D, then the voltage at S is equal to the sum of the voltages at A1 and A2, divided by square root of 2, and the voltage at D is equal to the voltage at A1 minus the voltage at A2, divided by square root of 2, and the impedance looking into either A1 or A2 is resistive and of magnitude Z.

(2) If equal impedances are connected to each of terminals S and D, then there is no coupling between A1 and A2, that is, if a voltage is applied to A1 only, no voltage will appear at A2, and vice versa.

FIG. 1 shows how, by means of the present invention, each of four antennas is driven by predetermined currents of each of four different types, "course sidebands", "course carrier", "clearance sidebands", and "clearance carrier", which will be abbreviated hereafter as CSB, CC, CLSB, and CLC respectively. The number of independent currents is reduced by a factor of two because of symmetry considerations; which dictate that, in order to radiate correct patterns, CSB and CLSB currents in two antennas symmetrically placed left and right of the array's center must be equal and 180° out of phase, while CC and CLC currents in two such antennas must be equal and in phase.

CSB and CC power from a course transmitter is supplied respectively to the terminals CSB and CC of FIG. 1. CLSB and CLC from a clearance transmitter is supplied to terminals CLSB and CLC. To each of the four terminals CSB, CC, CLSB, and CLC there is connected the input end of two power dividers. The two dividers connected to CSB are labeled D(1,1) and D(1,2) and their associated phase shifting lines of strength $(L-\phi)$ are labeled PS(1,1) and PS(1,2); the first index identifying the dividers and phase shift lines as being associated with CSB signal, while the second index identifies the antenna pair to which the divider supplies power. Antenna pairs are labeled AN(1) and AN(2) in FIG. 1. Similarly, CC dividers and phase shift lines are identified by indices (2,1) and (2,2), CLSB dividers and phase shift lines by indices (3,1) and (3,2), and CLC dividers and phase shift lines by indices (4,1) and (4,2). The divider of each type that is associated with the largest current of that type is a special case for which $\theta = 0$, i.e., its tap is at its input end, so that it degenerates into a quarter wave shorted line, which has infinite input impedance and can therefore be omitted. All such dividers are shown as dashed lines in FIG. 1, and are assumed to be associated with antenna pair AN(1). In practice, however, the largest current of a particular type may be associated with any antenna pair, not necessarily AN(1).

CSB and CLSB associated with AN(1) are generated by dividers and phase shift lines having indices (1,1) and (3,1), and added at the S terminal of coupler SB(1), from where they are conveyed through feeder line FSB to the A2 terminal of coupler OUT(1), which divides them into equal, 180° out of phase signals at the S and D terminals of OUT(1), from where they are conveyed to antenna pair AN(1) through feeder lines AF. Similarly;

CC and CLC associated with AN(1) are generated by dividers and phase shift lines (2,1) and (4,1), added by coupler C(1), divided equally and in phase by coupler OUT(1), and conveyed by feeders AF to antenna pair AN(1), CSB and CLSB associated with antenna pair AN(2) are generated by dividers and phase shift lines (1,2) and (3,2), added by coupler SB(2), divided equally and 180° out of phase by coupler OUT(2), and conveyed by feeders AF to antenna pair AN(2), CC and CLC associated with antenna pair AN(2) are generated by dividers and phase shift lines (2,2) and (4,2), added by coupler C(2), divided equally and in phase by coupler OUT(2), and conveyed by feeders AF to antenna pair AN(2).

The principle of the invention as shown in FIG. 1 can be extended to apply to arrays of any even number N of antennas, by using N/2 power dividers for each of the signal types CSB, CLSB, CC, and CLC, N/2 SB couplers, N/2 C couplers, and N/2 OUT couplers.

What is claimed is:

1. An electrical circuit for the distribution of modulated radio-frequency currents to each antenna of a linear array of antennas used for radiating Instrument Landing System Localizer signals, there being an even number N of antennas in said array, individual antennas being referred to here by an index number n which can represent any integer between 1 and N/2 inclusive, each index number n being applicable to either of a pair of antennas placed symmetrically left and right of the center of said array, each antenna having a nominal input impedance of Z ohms resistive, said electrical circuit consisting of;

four input terminals designated here as CSB, CC, CLSB, and CLC, three sets of bidirectional couplers, hereinafter referred to as couplers, each set comprising N/2 couplers, the members of each set being designated here as SB(n), C(n), and OUT(n), said couplers being conventional electrical devices having four terminals that will be referred to here as A1, A2, S, and D, said couplers having four properties if resistance of magnitude Z is connected to each of terminals S and D, the first property being that the voltage at terminal S will be the voltage at A1 plus the voltage at A2, divided by square root of 2, the second property being that the voltage at terminal D will be equal to the voltage at A1 minus the voltage at A2, divided by square root of 2, the third property being that the input impedance to either terminal A1 or terminal A2 will be equal to Z ohms resistive, the fourth property being that there is no coupling between terminals A1 and A2, four sets of power dividers, each set consisting of N/2 dividers, the four sets and members of each set being referred to here by the index numbers (m,n) m representing any integer between 1 and 4 inclusive, each divider consisting of a quarter wavelength of transmission line having characteristic impedance Z, said quarter wavelength line being shorted at one end, the other end of said quarter wavelength line being referred to here as an input end, said quarter wavelength line being tapped at electrical angle $\theta(m,n)$ from its input end, said angle $\theta(m,n)$ being determined by specified currents I(m,n) by solution of the equation $$I(m,n) = \frac{\cos(\theta(m,n))}{(1 + \frac{1}{3}\sin^2(\theta(m,n)))^{\frac{1}{2}}},$$

said currents being normalized so that the highest current for a particular value of index m is equal to 1.0, course sideband currents being specified by the subset I(1,n), course carrier currents being specified by the subset I(2,n), clearance sideband currents being specified by the subset I(3,n), clearance carrier currents being specified by the subset I(4,n), said tap being connected to one end of a phase shifting line having electrical length $(L(m)-\phi(m,n))$, said phase shifting line having characteristic impedance Z, $\phi(m,n)$ being determined from the formula, $$\phi(m,n) = \arctan(\tfrac{1}{2} \sin(2\phi(m,n))),$$

L(m) being an electrical length arbitrarily assigned for each value of m, the other end of said phase shifting line being referred to hereafter as the output end of power divider (m,n);

the input ends of dividers (1,n) being connected to input terminal CSB, the input ends of dividers (2,n) being connected to input terminal CC, the input ends of dividers (3,n) being connected to input terminal CLSB, the input ends of dividers (4,n) being connected to input terminal CLC, the output ends of dividers (1,n) being connected to input terminals A1 of couplers SB(n), the output ends of dividers (3,n) being connected to terminals A2 of couplers SB(n), the output ends of dividers (2,n) being connected to terminals A1 of couplers C(n), the output ends of dividers (4,n) being connected to terminals A2 of couplers C(n), the S terminals of couplers SB(n) being connected to the A2 terminals of couplers OUT(n), the S terminals of couplers C(n) being connected to terminals A1 of couplers OUT(n), the D terminals of couplers SB(n) and C(n) being connected to resistances of magnitude Z, all said connections between couplers OUT(n) and either SB(n) or C(n) being made by equal lengths of transmission line of characteristic impedance Z, the S terminals of couplers OUT(n) being connected through antenna feeder lines to antennas (n) on one side of the center of the array, the D terminals of couplers OUT(n) being connected through antenna feeder lines to antennas (n) on the other side of the center of the array, all said feeder lines being transmission lines of equal length and characteristic impedance Z.

* * * * *